June 23, 1970 R. L. TREUTHART 3,517,327
LASER OUTPUT COUPLER
Filed July 19, 1965 — 2 Sheets-Sheet 1
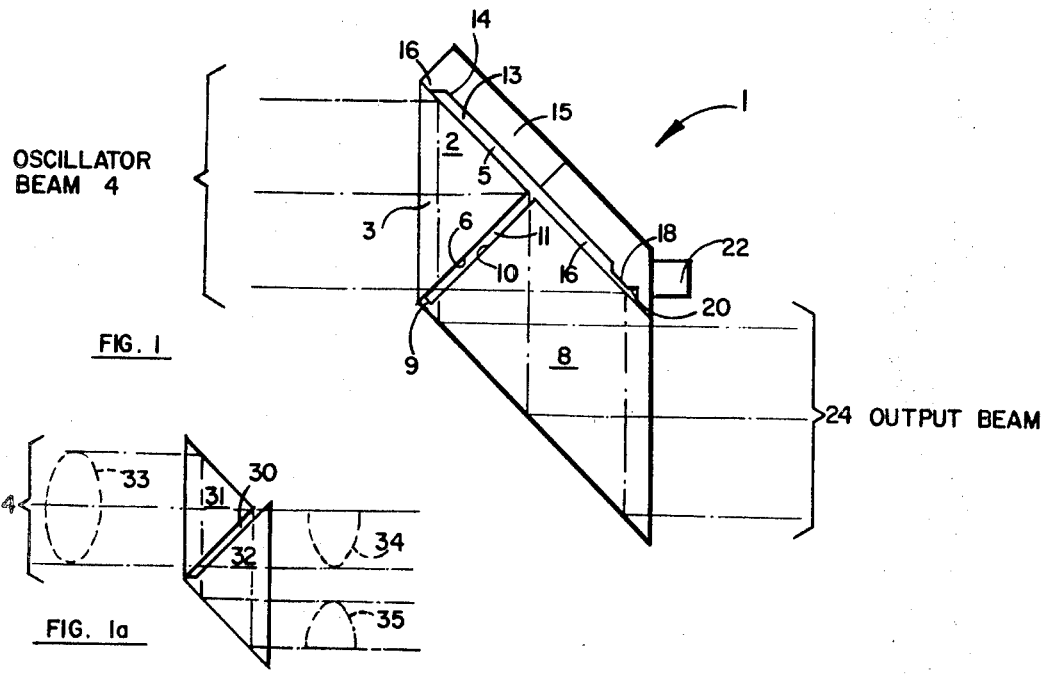
FIG. 1
FIG. 1a
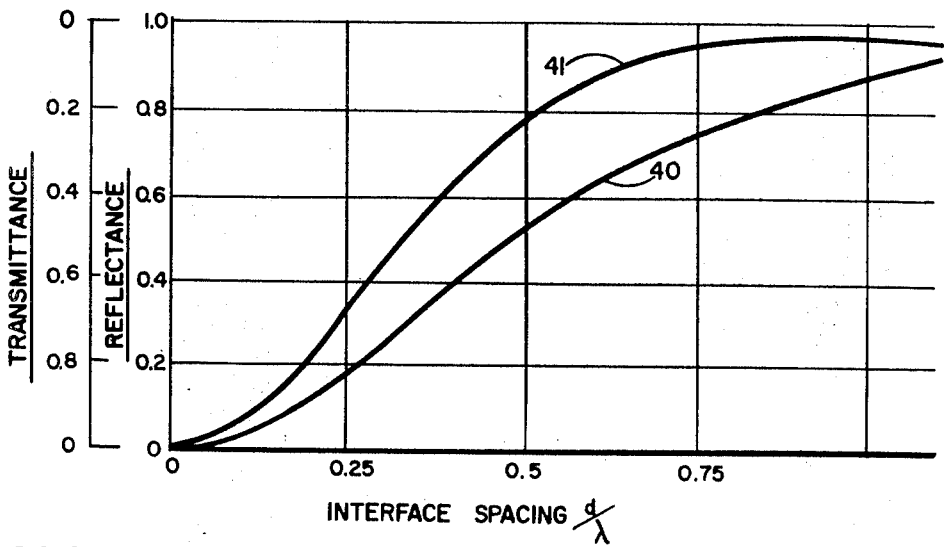
FIG. 2
INVENTOR.
ROBERT L. TREUTHART
BY Robert D. Rogers
ATTORNEY

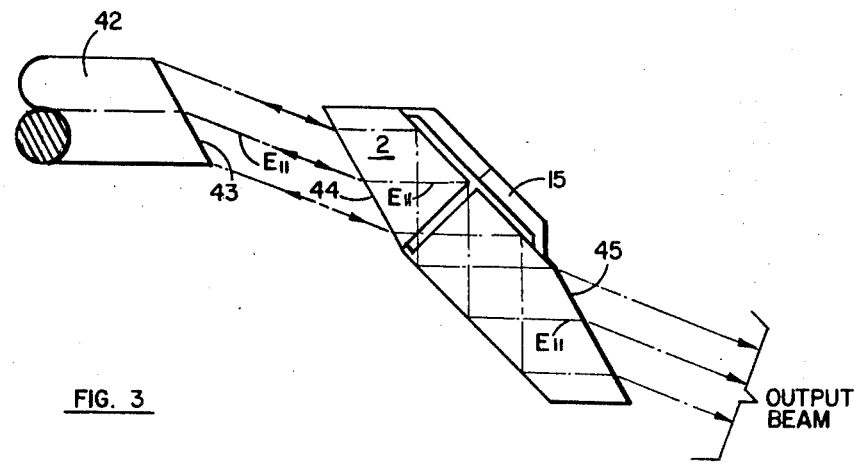
FIG. 3
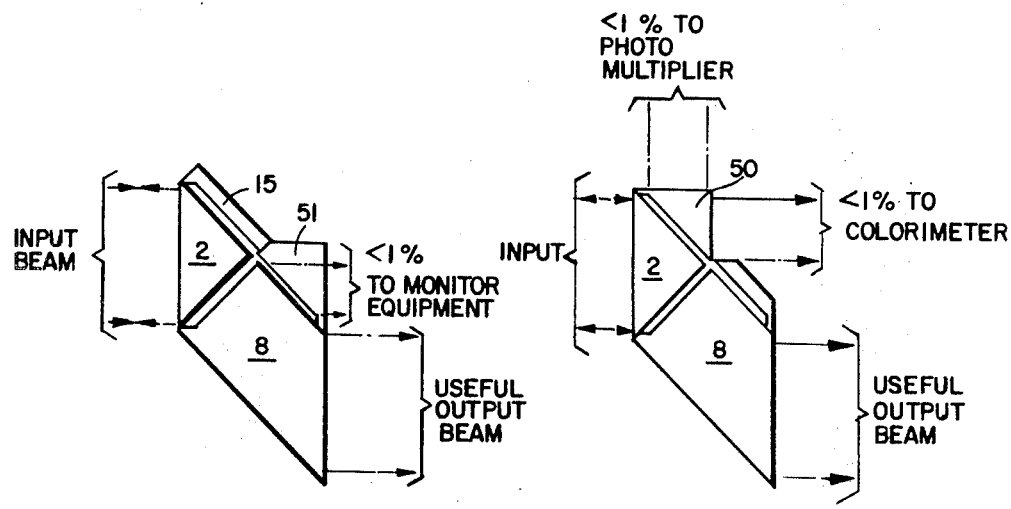
FIG. 4b
FIG. 4a

United States Patent Office 3,517,327
Patented June 23, 1970

3,517,327
LASER OUTPUT COUPLER
Robert L. Treuthart, Orange, Calif., assignor to North American Rockwell Corporation, a corporation of Delaware
Filed July 19, 1965, Ser. No. 473,052
Int. Cl. H01s 3/00
U.S. Cl. 331—94.5                                    17 Claims

ABSTRACT OF THE DISCLOSURE

A device for splitting an incident beam of laser radiation by means of a frustrated total internal reflection gap such that a portion of the incident beam is reflected onto itself and a portion is coupled through the device to provide an output beam substantially parallel to the direction of the incident laser radiation. The device is contained in a cover that provides protection for the gap and supports additional beam splitters for monitoring the incident laser radiation.

---

This invention relates to a laser output coupler and more particularly to a prism type output coupler using frustrated total internal reflection.

A laser oscillator typically employs an optically pumped structure of doped material disposed between mirrors forming a Fabry-Perot interferometer. High gain in the laser oscillator optical cavity thus formed is achieved, in part, by the high reflectivity of the mirror. However, to couple laser radiation out of the oscillator, one of the mirrors must exhibit some transmission. For optimum power output, a substantial transmission is needed.

Early in the laser technology, silver and aluminum coatings were employed, but were unsatisfactory because of their substantial absorption and consequent vaporization. Later, multilayer dielectric films were employed, but as laser energy and power levels increased the dielectric films also showed degradation. It is now not uncommon to require film replacement after only one high power laser output pulse. Even when a semitransparent dielectric film serving to couple output from a laser lasts for several firings, some degradation may occur with each shot, causing changing reflectivity of the optical resonant cavity. Inability to maintain constant operating parameters prevents reproducibility of performance or measurement.

The output coupler of the present invention overcomes the above disadvantage and provides a means of coupling energy out of a laser with no degradation of the coupler and no coupler-induced ambiguity of performance. The laser output coupler herein described is an optical component serving as a semitransparent termination of an oscillator optical resonant cavity, coupling energy out of the oscillator without dependence upon destructible optical coatings.

The output coupler of the present invention utilizes an input porro prism serving as a portion of a laser oscillator, an output prism, and a medium or interface separating the prisms. A cover plate may be added to prevent contamination of the interface and for measurement purposes if desired. Operation of the coupler is based on the principle of frustrated total internal reflection (FTIR) at the interface between the prisms, i.e., the incoming radiation would be totally reflected by coupling a percentage of the radiation into and through the output prism. The amount of interface separation establishes the fraction of light or radiation coupled from the input to the output prism. By selecting a suitable interface spacing, usually less than one wavelength at the particular wavelength employed, any desired transmission to reflection ratio can be achieved. Except for normal absorption in the solid material, which may be kept very small by proper selection of materials for a particular wavelength, all light not returned to the oscillator by the input prism is coupled through the output prism as a useful output beam.

Therefore, it is an object of this invention to provide an improved means for reflecting a fixed percentage of laser radiation back into a laser cavity and for transmitting a fixed percentage of laser radiation;

It is another object of this invention to provide a means for coupling energy out of a laser cavity with no degradation of the coupler and no coupler-induced ambiguity of performance;

Still another object of this invention is to provide a laser output coupler using a spacing between prisms for controlling the percentage of laser radiation reflected and transmitted;

Still another object of this invention is to provide a prism type laser coupler which may be used to couple laser radiation over a period of time without replacement;

It is still another object of this invention to provide an improved laser output coupler using frustrated total internal reflection;

It is still another object of this invention to provide an improved laser output coupler using frustrated total internal reflection and Brewster angle input and output surfaces.

These and other objects of the invention will become more apparent in connection with the following description taken in light of the drawings of which:

FIG. 1 is one embodiment of a prism type output coupler using air gap spacing;

FIG. 1(a) is a second embodiment of the device;

FIG. 2 is a graph showing reflection and transmittance versus spacing for laser emission;

FIG. 3 is an illustration of an output coupler using Brewster angle input and output surfaces;

FIG. 4(a) is an embodiment of a monitor pickoff arrangement for use with the output coupler; and FIG. 4(b) is a second embodiment of a monitor pickoff arrangement for use with the output coupler.

Referring now to FIG. 1, the preferred embodiment of the present invention is shown as comprising an input porro-reflector prism means 2 having one surface 3 supported by a frame (not shown) normal to the incoming laser oscillator beam 4. The other two surfaces 5 and 6 located normal to each other and at 45° to the input surface 3 form one boundary of the frustrated total internal reflection interface as described in detail hereinafter. An output prism means 8, joined and sealed to the outer edge of prism means 2 as at 9, has a recessed surface 10 so that an interface for a medium 11, such as an air space or gap, disposed between the recessed surface 10 of prism means 8 and the surface 6 of prism means 2, is encompassed. A similar space or gap 13 is provided adjacent the other or roof surface 5 of prism means 2. This gap 13 is formed by the recessed surface 14 of cover plate 15, joined and sealed at the outer edge of prism means 2, as at 16, and the surface 5 of prism means 2. The plate 15 is fabricated from the same material as prism means 2, and is preferably fabricated in two parts to permit easier assembly and fabrication. The prisms 2 and 8, as well as the cover plate 15, may be fabricated from fused silica or other materials, e.g., optical glass or crystal materials, which provide high dimensional stability and have the capability of withstanding a very high electromagnetic field strength without degradation.

The interface formed by the gaps 11 and 13 surrounding the two normal surfaces of prism means 2 are utilized to avoid sealing the surface of prism 2 with prism 8 and plate 15 directly along the entire surface, since direct sealing will degrade the total reflection. The periphery of the interface is sealed as at 9 and 16 to prevent contamination of the interface volume. The interface gap so formed may be measured by methods known in the art utilizing interference fringes.

The medium within the interface volume is preferably air, although it is within the purview of the present invention to utilize other gases, gas mixtures, vacuum, liquids or other materials having an index of refraction appropriately lower than that of the input prism 2. The interface volumes 11 and 13 formed for example by chemically milling recesses in prism 8 and plate 15 may also be formed by depositing silicon monoxide or other material along the peripherial edges of the output prism 8 and cover plate 15 to form a gasket-like raised area to which the input prism is sealed.

The cover plate 15 is provided with an integral raised portion 18 extending into the gap 13 between the plate 15 and the output prism 8 to provide a monitoring coupling gap 20. Thus, substantially all of the cover plate 15 is located many wavelengths from the input and output prisms 2 and 8 except for the monitoring portion 18 which forms a very small gap, e.g., of the order of 100 microinches, with one surface of the output prism 8. This small gap 20 of, for example, from one to three wavelengths in thickness, couples a small percentage of the beam energy to a monitoring photodetector 22. Such a monitoring pickoff of a small portion of the beam energy eliminates the necessity for probing a portion of the output beam 24 and therefore leaves the output beam unobstructed on its path to a laser output amplifier (not shown) or to a target device (not shown). The effect is that of a beam splitter, without the necessity of using coatings and without the introduction of aberration of the beam which might result from extra reflecting or transmitting optics. Such a monitoring arrangement facilitates the examination and monitoring of beam waveform and pulse energy and is particularly useful to provide a time reference for applications to range measuring devices.

The input prism 2 of the preferred embodiment is a porro prism having a right angle between the two sides 5 and 6 forming one boundary of the interface gaps 11 and 13. In this manner the incoming beam is reflected back parallel to its incoming path.

The output prism 8 has a configuration such that the output beam 24 is an accurate reconstruction of the input beam 4, i.e., all of the light incident upon surface 3 experiences the same number of reflections in passing through the coupler. When accurate reconstruction is not necessary the modification shown in FIG. 1a may be utilized. In this modified device, the interface gap 30 is provided only between the adjacent surfaces of two prisms 31 and 32 and where a cover plate could again be utilized, but is not shown. It is apparent that the incoming beam 4 will be split by this arrangement and that if the incoming beam has the cross section shown at 33 the beam will degenerate into two separated inverted portions 34 and 35 as shown in FIG. 1a.

Referring now to FIG. 2, curves of the transmittance and reflectance for various interface spacings utilizing air are shown based upon Fresnel's Coefficients as described in Born and Wolf, Principles of Optics, 39 (Pergamon Press, 1959). The curves were calculated on the basis that the index of refraction of fused silica is 1.45596 at the ruby crystal laser wavelength of 6943 A. and the angle of incidence on the interface is 45°. The curve 40 shows the variation of reflectivity for light having an electric vector parallel to the plane of incidence while curve 41 shows the variation of reflectivity for light having an electric vector normal to the plane of incidence. Thus, for example, if a reflectivity of 55 percent is desired to sustain laser emission from a ruby laser light source, a $d/\lambda$ of 0.52, or an interface gap spacing of 14.2 microinches is selected on the bases of curve 40. A reflectivity of 70 percent requires an interface gap spacing of 19 microinches, i.e., a $d/\lambda$ of approximately 0.7. From perpendicular polarization curve 41, a 55 percent reflectivity at 6943 A. requires a gap of about 10 microinches, i.e., a $d/\lambda$ of approximately 0.3. Since the incident beam 4 consists primarily of either perpendicularly polarized or parallel polarized light depending upon the orientation of the plane of incidence with respect to the laser crystal source the appropriate curve is selected and the resulting spacing for the desired reflectance utilized in the interface gaps 11 and 13. In this manner a preselected percentage of the incident laser beam may be reflected back to the laser cavity and transmitted through the output prism 8 by utilizing the principle of frustrated total internal reflection at the interface.

The embodiment of FIG. 3 shows a modification in which the input and output faces of the coupler of the present invention are provided at Brewster's angle to prevent undesirable reflectance at the input and output solid-air interface. The embodiment of FIG. 3 is a polarized system with parallel polarization used, and utilizes a laser rod 42 source having its output face 43 at Brewster's angle. The coupler, shown in schematic form, has its input face 44 and output face 45 oriented at Brewster's angle.

While the above described embodiments have utilized a fixed interface gap the structures shown may also utilize a variable interface gap. One arrangement for introducing a variable interface gap is to utilize a piezoelectric ceramic material in the interface gap 11 of FIG. 1 for optically coupling the prisms 2 and 8. The piezoelectric material may be mounted on the surface of the output prism along its periphery in place of the silicon monoxide layer described above. By calibrating the input voltage to the material as a function of piezoelectric deformation, the gap spacing can be changed to allow various transmission-to-reflection ratios over a wide range of wavelengths to be used. Other arrangements such as mechanical movement of one prism with respect to another while maintaining the interface gap sealed, e.g. bellows or telescoping sealed joints, may also be utilized to vary the gap spacing. The provision for varying the interface gap in the completed coupler allows more latitude in the precision to which the interface gap must initially be fabricated and provides versatility in use and choice of the transmission to reflection ratio.

When it is desired to sample or monitor a large area of the laser beam cross section, various monitor pickoffs may be provided. Examples of some monitor pickoff arrangements are shown in FIG. 4. In FIG. 4a the cover plate may be comprised of a prism 50 spaced above the input prism 2 for coupling a small percentage, e.g., less than one percent, of the laser energy to a photodetector and to a calorimeter. In FIG. 4b a modified prism 51 may be incorporated for coupling a small amount of the beam to externally located monitoring equipment well known in the art.

Although particular embodiments of the present invention have been described, various modifications will be apparent to those skilled in the art without departing from the scope of the invention. Therefore, the present invention is not limited to the specific embodiments disclosed but only by the appended claims.

I claim:

1. A laser output coupler comprising an input prism which functions as one termination of a laser resonant cavity, said input prism having at least first and second internally reflecting surfaces positioned to reflect a portion of the radiation emitted from the laser medium back into the laser medium, an output prism having an input surface, an output surface and at least first and second internally reflecting surfaces, said input surface being parallel to said first internally reflecting input prism surface and separated from said first internally reflecting prism surface by a frustrated total internal reflection interface gap, said two internally reflecting output prism surfaces being parallel to each other and to said second internally reflecting input prism surface, said output surface being positioned such that the total transmission length for all rays that travel through said two prisms is the same.

2. The laser output coupler comprising an input prism which functions as one termination of a laser resonant cavity, said input prism having at least first and second internally reflecting surfaces positioned to reflect a portion of the radiation emitted from the laser medium back into the laser medium, an output prism having an input surface, an output surface and at least first and second internally reflecting surfaces, said input surface being parallel to said first internally reflecting input prism surface and separated from said first internally reflecting prism surface by a frustrated total internal reflection interface gap of fixed width, said two internally reflecting output prism surfaces being parallel to each other and to said second internally reflecting input prism surface, said output surface being positioned such that the total transmission length for all rays that travel through said two prisms is the same.

3. The device as recited in claim 2 wherein said prism device is housed in a protective cover such that said cover encloses said air gap without interference in any manner with transmisison of said incoming laser radiation and yet maintains the spacing of said air gap and prevents entry of any foreign matter into said air gap.

4. The device as recited in claim 3 wherein incorporated on and integral with said cover is a second frustrated total internal reflection interface gap between said first prism and a third prism such that said interference gap permits a portion of said incoming laser radiation to pass through said interface gap to said third prism and thence to means for measuring the characteristics of the radiation passing through the said laser coupler.

5. The device as recited in claim 4 wherein a plurality of frustrated total internal reflection interface gaps are provided for splitting off portions of the incoming laser radiation.

6. The device as recited in claim 4 wherein said portion of incoming laser radiation split off by said frustrated total internal reflection gap is not more than one (1) percent of said incoming laser radiation.

7. The device as recited in claim 1 wherein said input prism has two internally reflecting surfaces.

8. The device as recited in claim 1 wherein said first and second internally reflecting surfaces of said input prism are mutually perpendicular.

9. The device as recited in claim 2 wherein said input prism has two internally reflecting surfaces.

10. The device as recited in claim 2 wherein said first and second internally reflecting surfaces of said input prism are mutually perpendicular.

11. The device as recited in claim 1 wherein said prisms have surfaces angularly disposed with respect to each other such that each laser radiation ray incident to said first prism travels an identical transmission length and is reflected through the same total number of angular degrees as said ray travel through said prism device such that said output laser radiation beam is substantially identical to said laser radiation beam.

12. The device as recited in claim 1 wherein said frustrated total internal reflection interface is an air gap wherein said gap thickness is variable such that the amount of incoming laser radiation reflected onto itself and the amount of incoming laser radiation passing through said air gap and into said second prism is dependent upon said gap thickness.

13. The device as recited in claim 1 wherein said prism device is housed in a protective cover such that said cover encloses said air gap without interference in any manner with transmission of said incoming laser radiation and yet maintains the spacing of said air gap and prevents entry of any foreign matter into said air gap.

14. The device as recited in claim 13 wherein said cover provides means for varying said air gap thickness.

15. The device as recited in claim 13 wherein incorporated on and integral with said cover is a second frustrated total internal reflection interface gap between said first prism and a third prism such that said interface gap permits a portion of said incoming laser radiation to pass through said interface gap to said third prism and thence to means for measuring the characteristics of the radiation passing through the said laser coupler.

16. The device as recited in claim 15 wherein a plurality of frustrated total internal reflection interface gaps are provided for splitting off portions of the incoming laser radiation.

17. The device as recited in claim 15 wherein said portion of incoming laser radiation split off by said frustrated total internal reflection gap is not more than one (1) percent of said incoming laser radiation.

References Cited

UNITED STATES PATENTS

| | | | |
|---|---|---|---|
| 1,897,874 | 2/1933 | Tuttle et al. | 350—173 |
| 2,240,988 | 5/1941 | Hertel | 350—173 X |
| 2,476,014 | 7/1949 | Wright | 350—173 X |
| 2,565,514 | 8/1951 | Pajes | 350—285 |
| 2,815,695 | 12/1957 | Scharf et al. | 350—173 X |
| 2,925,751 | 2/1960 | Miles | 350—173 X |
| 2,997,922 | 8/1961 | Kaprelian | 350—285 |
| 3,057,251 | 10/1962 | Mahn | 88—1.5 X |
| 3,179,899 | 4/1965 | Fox | 331—94.5 |
| 3,291,554 | 12/1966 | Price | 350—285 |
| 3,308,395 | 3/1967 | Sorokin | 331—94.5 |
| 3,332,314 | 7/1967 | Rosenthal. | |
| 3,353,115 | 11/1967 | Maiman | 331—94.5 |
| 3,353,894 | 11/1967 | Harris | 350—150 |

FOREIGN PATENTS

| | | |
|---|---|---|
| 608,711 | 3/1962 | Belgium. |

OTHER REFERENCES

Bergstein et al.: "A Total-Reflection Solid-State Optical-Maser Resonator," Proc. IRE, vol. 50, p. 1833, August 1962.

Godzinski: "Application of Total Internal Reflection Prisms for Gaseous Lasers," Proc. IEEE, vol. 51, p. 361, February 1963.

Hull: "The German Army 'Speech-on-Light' Signalling Apparatus," Electronic Engineering, vol. 16, pp. 185–87 and 211, October 1943.

JEWELL H. PEDERSEN, Primary Examiner

E. BAUER, Assistant Examiner

U.S. Cl. X.R.

350—173, 285, 286